(12) United States Patent
Hartwig et al.

(10) Patent No.: US 8,572,490 B2
(45) Date of Patent: *Oct. 29, 2013

(54) EMBEDDED VIDEO PLAYER

(75) Inventors: Gunthar Hartwig, Berkeley, CA (US);
Jasson Arthur Schrock, Mountain View, CA (US); Nikhil Chandhok, San Francisco, CA (US); Christian Oestlien, San Francisco, CA (US); Aaron Kwong Yue Lee, San Francisco, CA (US)

(73) Assignee: Google Inc., Mountain View, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 13/277,875

(22) Filed: Oct. 20, 2011

(65) Prior Publication Data
US 2012/0042250 A1    Feb. 16, 2012

Related U.S. Application Data

(63) Continuation of application No. 11/779,856, filed on Jul. 18, 2007, now Pat. No. 8,069,414.

(51) Int. Cl.
*G06F 3/00* (2006.01)
*G06F 3/048* (2013.01)
*G06F 17/00* (2006.01)
*H04N 7/173* (2011.01)
*H04N 7/16* (2011.01)

(52) U.S. Cl.
USPC ........... 715/719; 715/716; 715/722; 715/731; 715/760; 715/788; 715/204; 715/203; 725/110; 725/135

(58) Field of Classification Search
USPC ......... 715/719, 716, 731, 788, 760, 722, 203, 715/204; 725/110, 135
See application file for complete search history.

(56) References Cited

U.S. PATENT DOCUMENTS

| | | |
|---|---|---|
| 2002/0007418 A1 | 1/2002 | Hedge et al. |
| 2002/0129089 A1 | 9/2002 | Hedge et al. |
| 2004/0070600 A1 | 4/2004 | Morrisroe et al. |
| 2007/0288518 A1 | 12/2007 | Crigler et al. |
| 2008/0028037 A1 | 1/2008 | Moyer et al. |
| 2008/0086689 A1 | 4/2008 | Berkley et al. |
| 2008/0109300 A1 | 5/2008 | Bason |
| 2008/0109844 A1 | 5/2008 | Baldeschwieler et al. |
| 2008/0184117 A1 | 7/2008 | Alsbury et al. |
| 2008/0244038 A1 | 10/2008 | Martinez et al. |

FOREIGN PATENT DOCUMENTS

WO    WO 2008/136794 A    11/2008

*Primary Examiner* — Ting Lee
(74) *Attorney, Agent, or Firm* — Fenwick & West LLP

(57) ABSTRACT

A system, method and various user interfaces provide an embedded web-based video player for navigating video playlists and playing video content. A website publisher can create and store a video player with customized parameters (e.g., player type, appearance, advertising options, etc.) and can associate the player with a playlist of selected videos. The stored video player is associated with a player ID in a player database and can be embedded in a website using an embed code referencing the player ID. A user interface for the embedded player provides controls for controlling video playback and for controlling the selection of a video from the playlist.

25 Claims, 14 Drawing Sheets

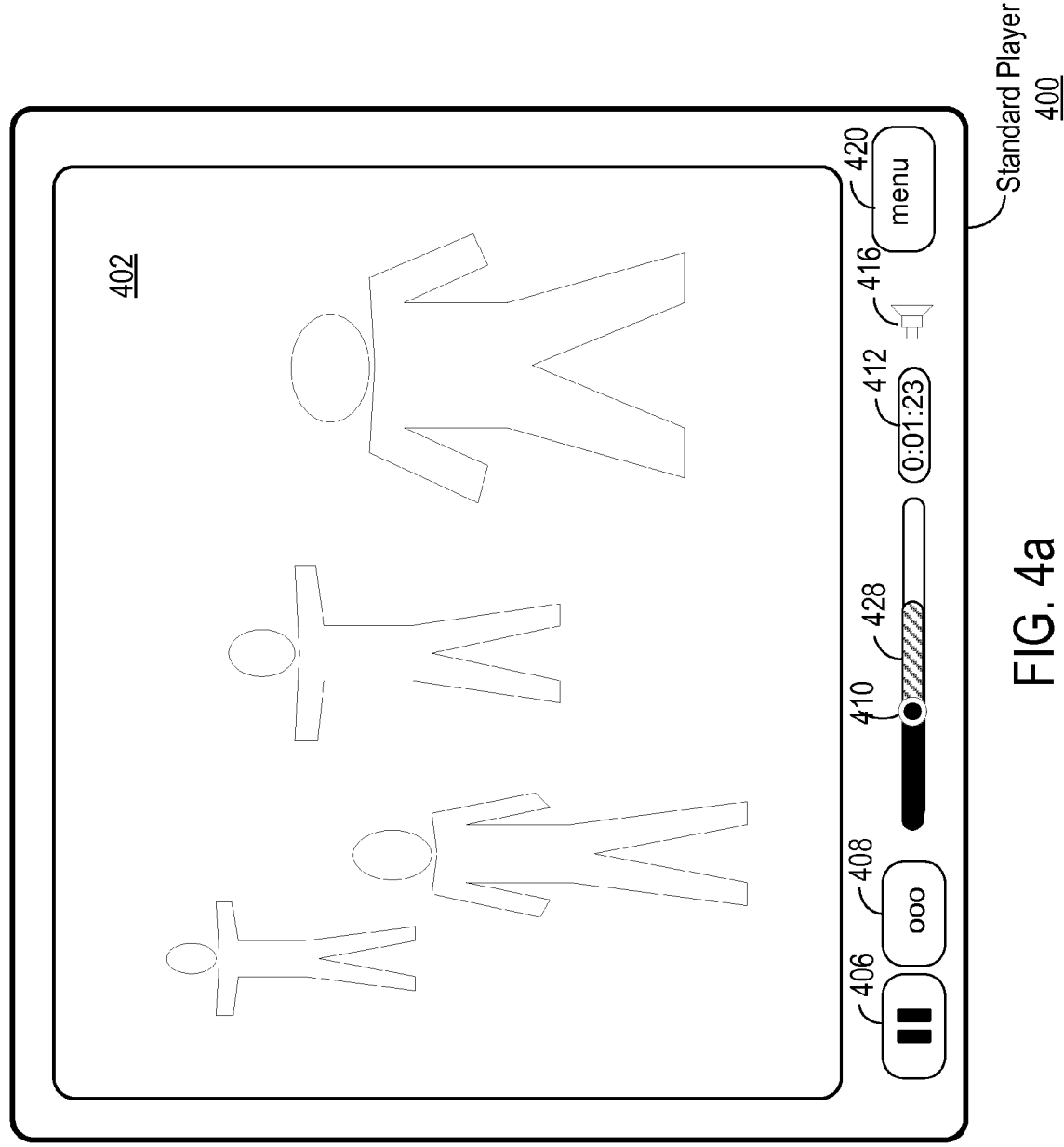

Player Information

Enter a name and description for your player.

Player Name: My player

Description: My first player

Player Preview

Theme

Select a basic color theme for your player.

Layout

Choose a layout for the Player.

Full-Size   Standard   Leaderboard

Content

Choose a playlist, videos, or your favorites to provide content for this player. By creating this custom player, you will have greater control over the content of your embedded content.

My Videos
Favorites
Playlist 1
Playlist 2
Playlist 3
Playlist 4

Playlist 2
This is description information about Playlist 2.

Press "Select" to set your content selection.

Select

Embed Code 624

Copy and paste the code at right to embed the video.

Copy to Clipboard

626

```
<object width="425" height="350"><param name="movie" value="http://www.youtube.com/v/ahWJyIC0BRU"></param><embed src="http://www.youtube.com/v/ahWJyIC0BRU" type="application/x-shockwave-flash" width="425" height="350"></embed></object>
```

Finish

Press "Save Player" to update your player.

Save Player

FIG. 6b

EMBEDDED VIDEO PLAYER

CROSS-REFERENCE TO RELATED APPLICATIONS

This application is a continuation of U.S. patent application Ser. No. 11/779,856, entitled "Embedded Video Player," to Hartwig, et al. filed on Jul. 18, 2007 and incorporated by reference herein in its entirety.

BACKGROUND

1. Field of the Invention

The present invention relates generally to web-based video display and specifically to a creation and display of a user interface for viewing embedded video playlists.

2. Description of the Related Art

The sharing of video content on websites has developed into a worldwide phenomenon, supported by dozens of websites. On average, many thousands of videos are posted every day, and this number is increasing as the tools and opportunities for capturing video become easier to use and more widespread. Videos are typically viewed at a video hosting website such as YouTube, operated by YouTube, LLC of San Bruno, Calif. Users browsing the video hosting website can find videos of interest by, for example, searching for videos, browsing video directories, or sorting videos by ratings assigned to the videos.

Some video hosting sites allow users to create video playlists associated with a personal account on the host site. These playlists comprise a set of videos selected by a user from a video database. For example, a user may create a playlist compiling his/her favorite basketball plays, his/her favorite music videos, or his/her favorite movie clips. Conventionally, a playlist can be stored and retrieved at a later time by the account holder through the host site.

Recently, there has been an emergence of a large number of personal websites, weblogs ("blogs"), or other websites dedicated to publishing user generated content. Publishers of these websites often want to be able to embed video content directly into their web pages. In order to accommodate this need, some host sites provide publishing tools for generating an embed code that can be inserted into an external website. The embed code, when executed, causes a video from the host site to be displayed in an embedded player on the external website.

However, conventional embedded players have user interfaces that do not support or are not well adapted to handle video playlists. Furthermore, conventional publishing tools are not well suited for creating embedded players and associated playlists that are adequately customizable and simple to update. Thus, there remains a need for improved user interfaces for creating and viewing customized players and playlists that are both satisfying to the viewer and effective for meeting the goals of website publishers.

SUMMARY

The present invention provides a user interface for creating players designed for viewing video playlists embedded on a website. A video hosting web site stores a video database of shared video content that can be accessed by a client using a web browser. The video hosting web site further comprises publishing tools that allow a content publisher to customize a player according to a variety of parameters (e.g., player type, color theme, advertising options, etc.) and store the parameters of the player in a player database. The player is associated with the publisher and can be further associated with a playlist of multimedia content such as audio and videos from the video database or a selection of advertising preferences.

A player from the player database can be embedded into a web page, such as a publisher's web page, using an embed code that contains a player identifier associated with the specific player in the player database. The embed code, when executed, causes the identified video player to be displayed on the web page according to the customized parameters and playlists associated with the player. The player includes a viewing window and various controls and options that allow a user viewing the web page to navigate the playlist and play the videos. When a video from the playlist is to be played, the player connects to the video hosting site and retrieves the video from the video database at the host site. In one embodiment, advertisements are displayed along with the video content from the playlist according to advertisement preferences associated with, for example, the client, the player, the content, or the web site providing the content for the player. In one embodiment, revenue generated from the advertisements is shared between one or more of the video hosting site, the advertising management site, the publisher of the custom player, and the original provider of the video content.

Because the player information includes a pointer to one or more playlists, a publisher can change the contents of a playlist without needing to edit the player. Since the player includes a pointer to the playlist rather than the playlist itself, the updated playlist will automatically be referenced by the player. In addition, altering the player does not require generation of a new embed code—consequently, any web page that embeds the player will automatically represent the updated version of the player without any further required coding.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE FIGURES

FIG. 4a is an example interface for a standard video player during normal playback of a video in accordance with an embodiment of the present invention.

FIGS. 6a and 6b illustrate user interface pages for creating and modifying a video player in accordance with an embodiment of the present invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
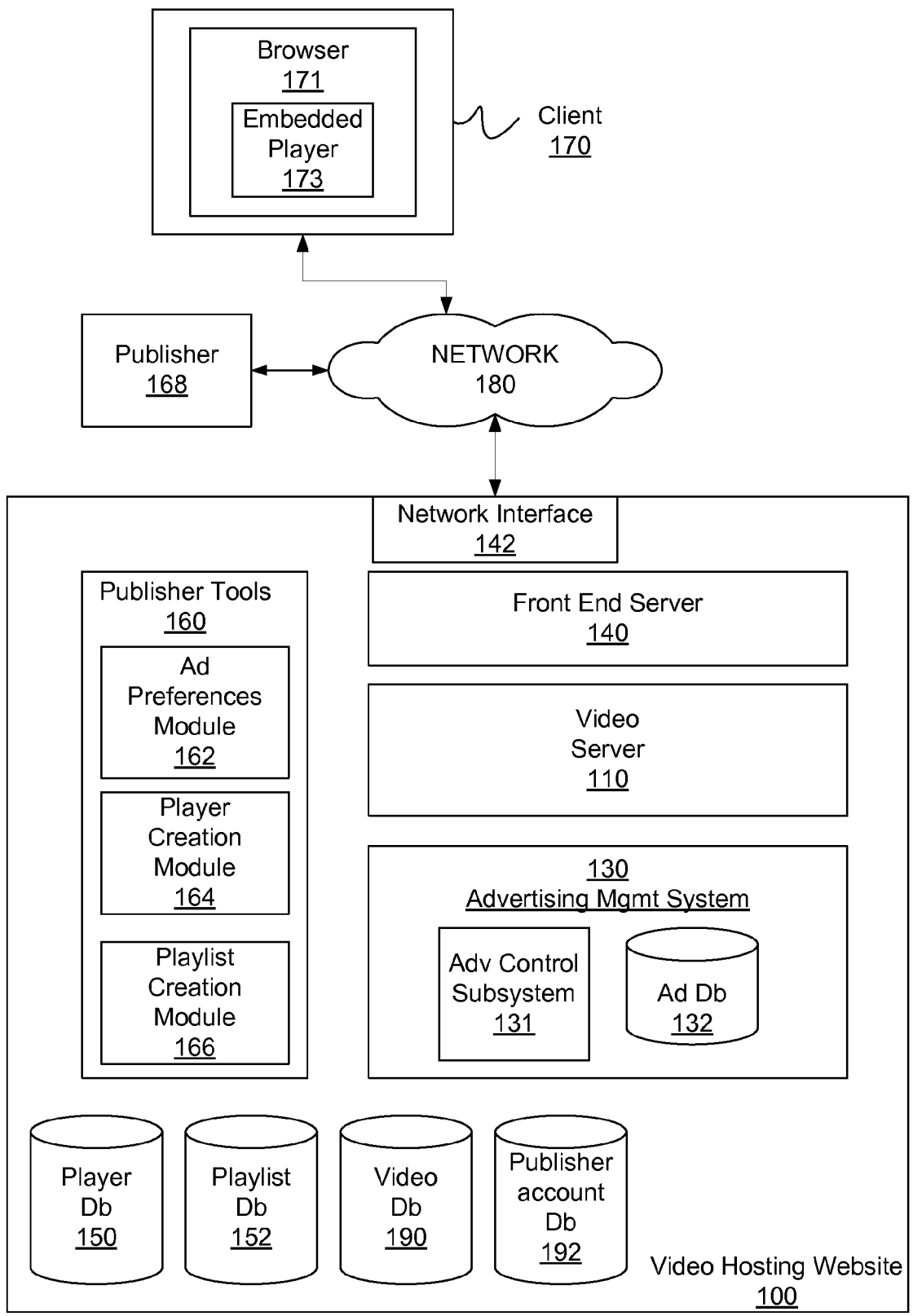
FIG. 1 is a block diagram of a system architecture for providing embedded video playlists and video content in accordance with an embodiment of the present invention.

FIG. 1 is a block diagram of a system architecture in accordance with one embodiment. As illustrated in FIG. 1, a video hosting website 100 includes a front end server 140, a video server 110, a network interface 142, publisher tools 160, an advertising management system 130, and various databases including a player database 150, a playlist database 152, a video database 190, and a publisher account database 192. Other conventional features, such as firewalls, load balancers, application servers, failover servers, site management tools, and so forth are not shown so as to more clearly illustrate the features of the system. A suitable website 100 for implementation of the system is the YOUTUBE™ website, found at www.youtube.com; other video hosting sites are known as well, and can be adapted to operate according the teaching disclosed herein. It will be understood that the term "website" represents any method of uploading and downloading content and is not intended to be limited to content uploaded or downloaded via the Internet or the HTTP protocol. The various servers are conventionally implemented, whether as a single piece of software or hardware or as multiple pieces of software or hardware and can couple to the network 180 via the network interface 142. In general, functions described in one embodiment as being performed on the server side can also be performed on the client side in other embodiments if appropriate.

In one embodiment, publishers 168 register with video hosting website 100, which maintains a publisher account database 192, with an account for each publisher 168. The account database 192 can be used to store authentication information as well as account preferences.

A client 170 executes a browser 171, and connects to the front end server 140 via a network 180, which is typically the Internet, but may also be any network, including but not limited to a LAN, a MAN, a WAN, a mobile, wired or wireless network, a private network, or a virtual private network. While only a single client 170 and browser 171 are shown, it is understood that very large numbers (e.g., millions) of clients are supported and can be in communication with the website 100 at any time. In some embodiments, the browser 171 includes an embedded video player 173 such as, for example, the Flash™ player from Adobe Systems, Inc. or any other player adapted for the video file formats used in the video hosting website 100.

In one embodiment, a content publisher 168 can create and store custom video players and playlists using the publisher tools 160 available at the video hosting website 100. In alternative embodiments, the publisher tools 160 can be external to the video hosting website 100 (e.g., available on a third-party website or as part of an application installed on a host computer). The publisher tools 160 include a player creation module 164, a playlist creation module 166, and an ad preferences module 162. Creation of a player is described further below, with respect to FIGS. 6a and 6b.

The playlist creation module 166 allows a content publisher 168 to create a playlist from videos available in the video database 190. In one embodiment, the playlist comprises a set of videos selected by the publisher 168. In another embodiment, the playlist creation module 166 automatically generates a playlist from videos in the video database 190. The playlist can be generated, for example, based on keywords, subscriptions, popularity, or other preferences provided by the publisher 168. Playlists (and/or preferences for generating an automatic playlist) are stored in the playlist database 152. Playlists may be either ordered or unordered, depending on the preference of the playlist creator or the video hosting website 100.

The player creation module 164 allows a publisher 168 to create a customized embedded player that can be associated with a playlist and other player parameters. For example, the publisher 168 can choose a player type, player skin, player color, or a variety of other custom parameters associated with the user interface of the player. Examples of user interfaces for custom players will be discussed in more detail below with reference to FIGS. 3-5. The publisher 168 can also associate the player with one or more playlists from the playlist database 152 or with advertising preferences as will be described below. Thus, in one embodiment, the parameters include a pointer to a playlist in the playlist database 152 and/or advertising preferences. The player creation module 166 stores the custom player in the player database 150. In other embodiments, advertisers can specify their preferences for where their ads are placed, and these preferences are stored in an ads database (not shown).

In one embodiment, each player is associated with a unique ID that identifies the specific player and its parameters. The player creation module 164 can furthermore generate and output an embed code that references the created player in the player database 150 by its unique ID. In one embodiment, the embed code is HTML code (or other source code) that can be inserted into the source code of a website. The embed code, when executed by the browser 171, provides a link such as a URL to the player in the player database 150. Thus, when the website is loaded in a browser 171, the browser 171 displays the customized embedded player 173 returned by the video hosting website 100. The embed code in one embodiment also includes additional display parameters, such as the size of the player window, an application type, and the like. Any playlist or advertising preferences associated with the specific player are also loaded to the embedded player 173. Alternatively, the embed code itself can include a pointer to a specific playlist in the playlist database 152. In this embodiment, the playlist can be modified by modifying the embed code instead of relying on an association to a playlist stored as a player parameter.

In alternative embodiments, the player can be one of a selection of predefined players rather than a user-created player. For example, the video hosting site 100 may provide a predefined set of players stored in player database 150 and available to publishers for use. Furthermore, players created by one user can be used by other users by copying the embed code, or in one embodiment by consulting an index or table of contents provided by video hosting website 100 or by a third party. In one embodiment, any revenue generated by embedding a particular player in multiple web sites result in the associated revenue accruing at least partly to the creator of the player. In some cases, this will be the publisher. In some cases, this will be the player's creator.

The ad preferences module 162 allows a publisher 168 to optionally associate advertisements with a custom player or with videos in the playlist. In one embodiment, an advertising management system 130 stores advertising content to be presented along with the requested content from the playlist. In some instances, the advertising content is in the same format as the requested content (e.g., video advertising for a video content request). In other instances, other types of advertising are presented, such as pure text advertising, advertising providing a hyperlink to an advertiser's website, text-and-audio advertising, and still image advertising. An advertising control subsystem 131 both manages access to the advertising content stored in the advertising database 132, and also serves to associate certain advertising content with certain requested content from the playlist. In one embodiment, the association is made solely on the content of the requested video, while in another the association is made based on other factors as well, such as playlist-specific information stored in the playlist database 152. Systems and methods for selecting relevant advertising content are described further in U.S. Provisional Patent Application No. 60/946,702, titled "Selection of Advertisements for Placement with Content" filed on Jun. 27, 2007, and incorporated by reference herein in its entirety.

In one embodiment, by allowing advertisements to be associated with a custom player, a content publisher 168 can share in profits generated from the advertisers. For example, advertisers can be charged a fee for placement of ads on either a cost-per-click, cost-per-thousand-impressions, cost-per-action, or other basis. Revenues from advertisers can be shared according to a variety of different processes. In one embodiment, a portion of the revenue generated through a particular player is given to the publisher 168 of that player and another portion of the revenue is given to the video hosting website 100. In another embodiment, a portion of the generated revenue is given to the original provider of the video content. Systems and methods for revenue sharing models are described further in U.S. patent application Ser. No. 11/755,264, titled "Flexible Revenue Sharing and Referral Bounty System" filed on May 30, 2007, and incorporated by reference herein in its entirety.

Figure 2:
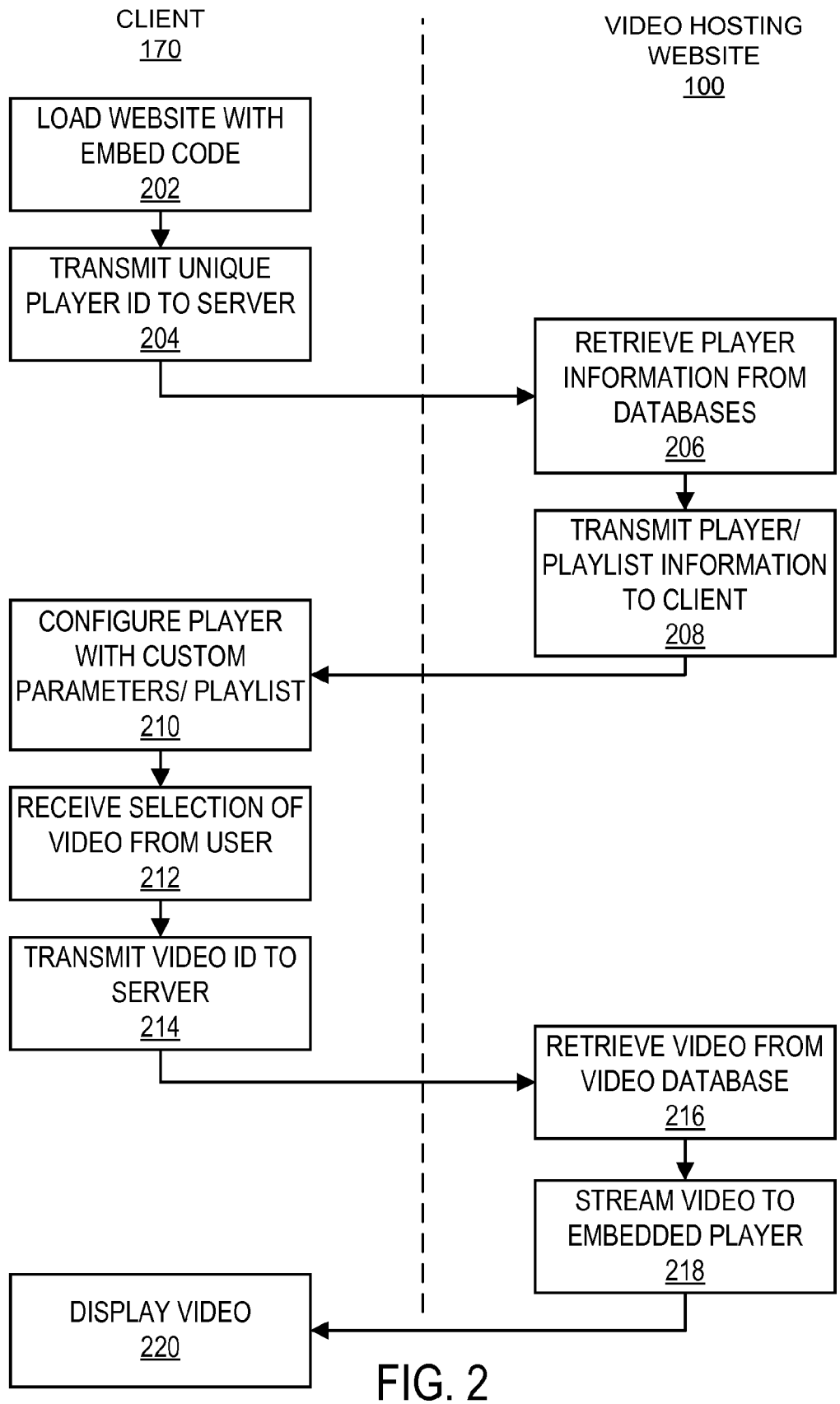
FIG. 2 is a process flow for using an embedded video player for video playlists in accordance with an embodiment of the present invention.

FIG. 2 illustrates a process for providing video content including playlists using an embedded player. The process illustrates steps performed by the client 170 and the video hosting website 100. In alternative embodiments, the steps may be performed by different modules or devices. The browser 171 first loads 202 a website having embed code associated with a specific player stored in the player database 150. The browser 171 transmits 204 a unique ID corresponding to the player to the front end server 140 of the video hosting website 100. The server 140 retrieves 206 the player information from the player database 150 and transmits 208 the player information to the client 170. It is noted that if the player is associated with a playlist in the playlist database 152, the playlist information is also transmitted to the client 170. The playlist information can include, for example, links to each video in the playlist and thumbnails corresponding to the videos in the playlist. The browser 171 configures 210 the embedded player 173 with the appropriate parameters and loads the playlist information to the embedded player 173. If a video selection is received 212 from a user, the browser 171 transmits 214 a video ID corresponding to the video to the video hosting website 100. It is noted that steps 212 and 214 are optional, and in alternative embodiments the video can begin playing automatically without any user input. For example, videos can automatically play in sequential order or in a random order. The video server 110 retrieves 216 the selected video from the video database 190 and streams 218 the video to the embedded player 173 via the network 180.

Using the above described system, the embed code need only specify the player ID, and does not need to include the player parameters or playlist information within the code itself. Thus, a publisher 168 does not need to re-generate the embed code or re-insert the embed code into the website each time changes are made to the player or playlist so long as the player ID remains the same. Instead, the publisher 168 can merely use the publishing tools 160 to update a playlist or player preferences associated with the player ID. Alternatively, the embed code can reference the player and playlist separately so that, for example, the playlist can be changed by altering the embed code without changing the player or vice versa.

Content publishers can easily embed players created by other publishers and receive the same updates to the player or playlists. For example, assume publisher A creates a custom player with a playlist of "baseball plays of the day". Publisher A embeds the player on her website and updates the playlist every day with a new selection of videos. Publisher B has a website about baseball and wants to use Publisher A's custom player. Publisher B can insert Publisher A's embed code on his website and the same player and playlist will be displayed. Because the embed code on Publisher B's website is associated with the specific player ID, Publisher B's website will also retrieve the updated playlist each day without requiring any additional action from Publisher B. Thus, the system allows a publisher to broadcast a third-party player/playlist without requiring any maintenance by the publisher.

FIGS. 3-5 illustrate various example embodiments of embedded video players 173 for navigating and viewing video playlists. It is noted that the illustrated embodiments are included for the sake of example, and that other variations of video players are possible without departing from the scope of the invention. Furthermore, the various aspects of the player appearance can be customized by a publisher 168 using the player creation module 164. FIGS. 3a-3e illustrate a first video player type referred to herein as a full-size player 300. Referring first to FIG. 3a, the full-size player 300 is illustrated during normal playback of a video. The full-size player 300 comprises a main viewing window 302, a playlist window 304, and various controls. The main viewing window 302 displays the currently selected video from the playlist. The playlist window 304 displays thumbnails 326 corresponding to videos in the video playlist. In one embodiment, a thumbnail 326 is an image frame (e.g., the first frame) from a video in the playlist.

In one embodiment, the full-size player 300 includes various player controls and indicators including, for example, a play/pause button 306, a play all button 308, a progress bar 310, a time indicator 312, a volume control 314, and mute button 316. The player 300 also includes playlist controls such as a playlist button 318, a menu button 320, a scroll left button 322, and a scroll right button 324. These controls and indicators are described in further detail below.

The play/pause button 306 toggles between a play mode and pause mode of the video in the main viewing window 302. For example, during playback, clicking on the play/pause button 306 causes the player to pause the video in the main viewing window 302 at the current frame. A paused video can be resumed by again clicking the play/pause button 306.

The play all button 308 toggles a "play all" feature on or off. When the "play all" feature is on, the player 300 will automatically play the next video in the playlist when the current video ends. When the "play all" feature is toggled off, the player does not automatically proceed to the next video in the playlist. Instead, when the current video ends, the player presents the user with an end-of-video screen as will be described below with reference to FIG. 3e.

The slider control 310 indicates the progress in time of the current video in the main viewing window 302. In one embodiment, the user can navigate to a particular frame of video by manually moving the slider control 310 (e.g., by clicking and dragging the slider). In one embodiment, the slider control 310 includes a download progress bar 328 indicating the portion of the video that has been downloaded. Video progress can also be monitored using the timer indicator 312 which digitally displays the current time of the video (e.g., in hours:minutes:seconds format).

A volume control 314 allows the user to control the audio volume of the streaming video. For example, in one embodiment the user can increase the volume by sliding the volume control 314 to the right and decrease the volume by sliding the volume control to the left. In one embodiment, the player further includes a mute toggle button 316 that toggles a mute function on or off.

The playlist window 304 illustrates a set of thumbnails 326 corresponding to videos in the video playlist. In one embodiment, the thumbnails are animated. The user can navigate the videos in the playlist by clicking on a thumbnail 326 in the playlist window 304. If the number of videos in the playlist exceeds the number of thumbnails 326 displayed in the playlist window 304, the user can select the scroll left 322 or scroll right 324 button to scroll through additional thumbnails 326 in the playlist window 304.

Figure 3A:
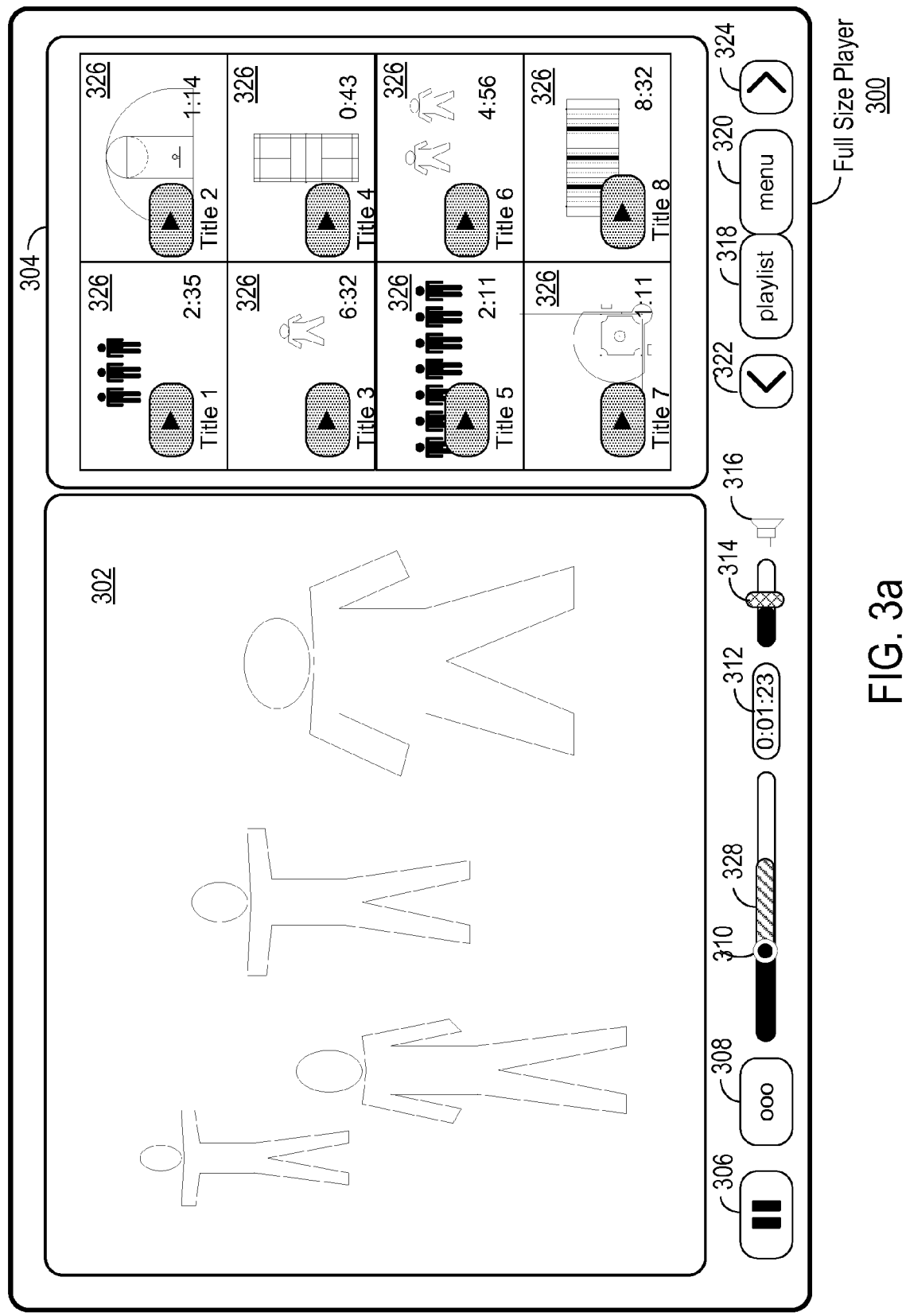
FIG. 3a is an example interface for a full-size video player during normal playback of a video in accordance with an embodiment of the present invention.
Figure 3B:
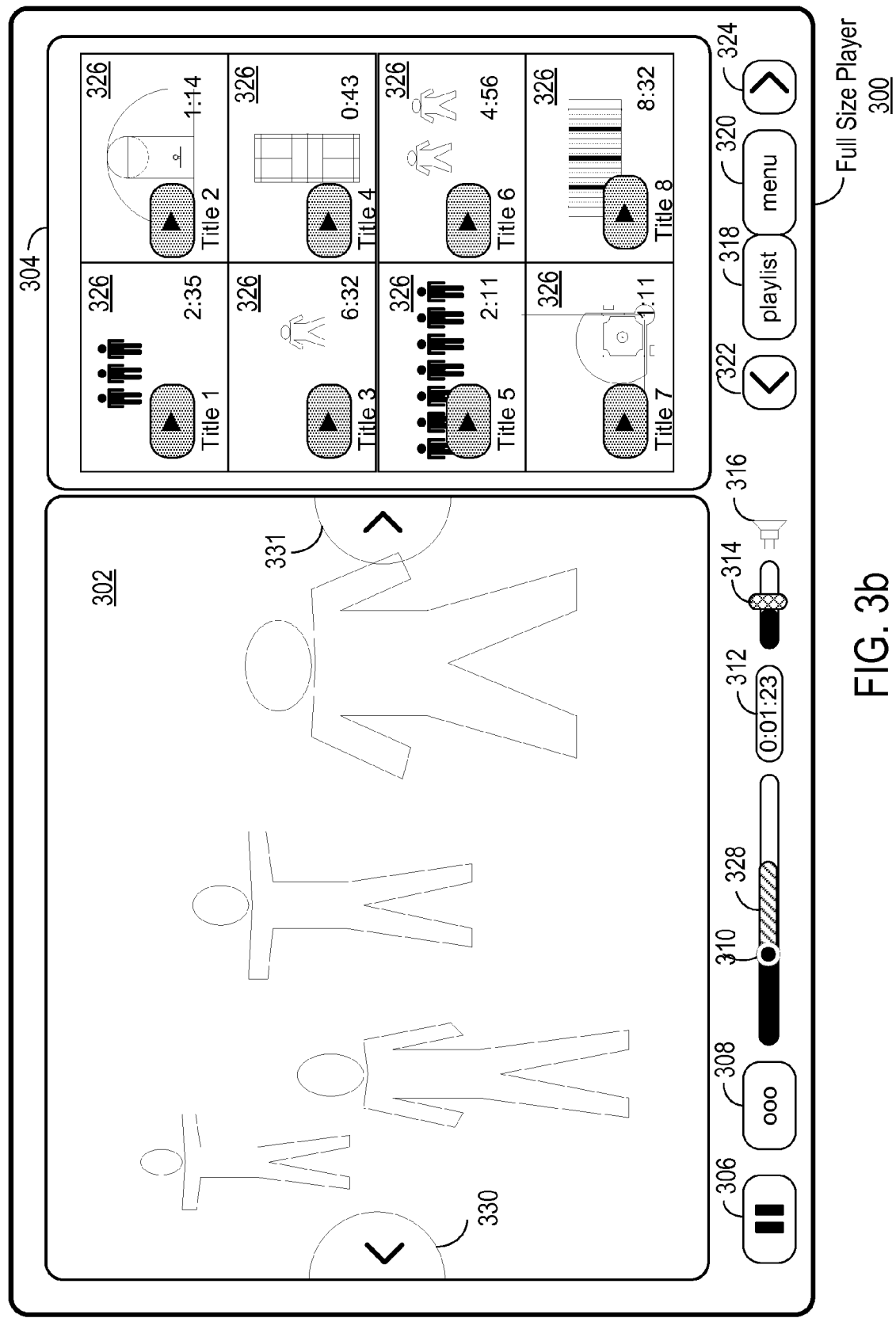
FIG. 3b is an example interface for a full-size video player after a pointer rollover in accordance with an embodiment of the present invention.

In one embodiment, the user can also navigate between videos in the playlist through pointer rollover controls. For example, as illustrated in FIG. 3b, when the user rolls the pointer over the main viewing window 302, a previous button 330 and next button 331 appears over the video. Clicking the previous button 330 loads the previous video in the playlist in the main viewing window 302 while clicking on the next button 331 loads the following video in the playlist. Rolling the pointer off the main viewing window 302 hides the previous button 330 and next button 331 (e.g., as illustrated in FIG. 3a). In one embodiment, controls similar to controls 330, 331 are always visible.

Figure 3C:
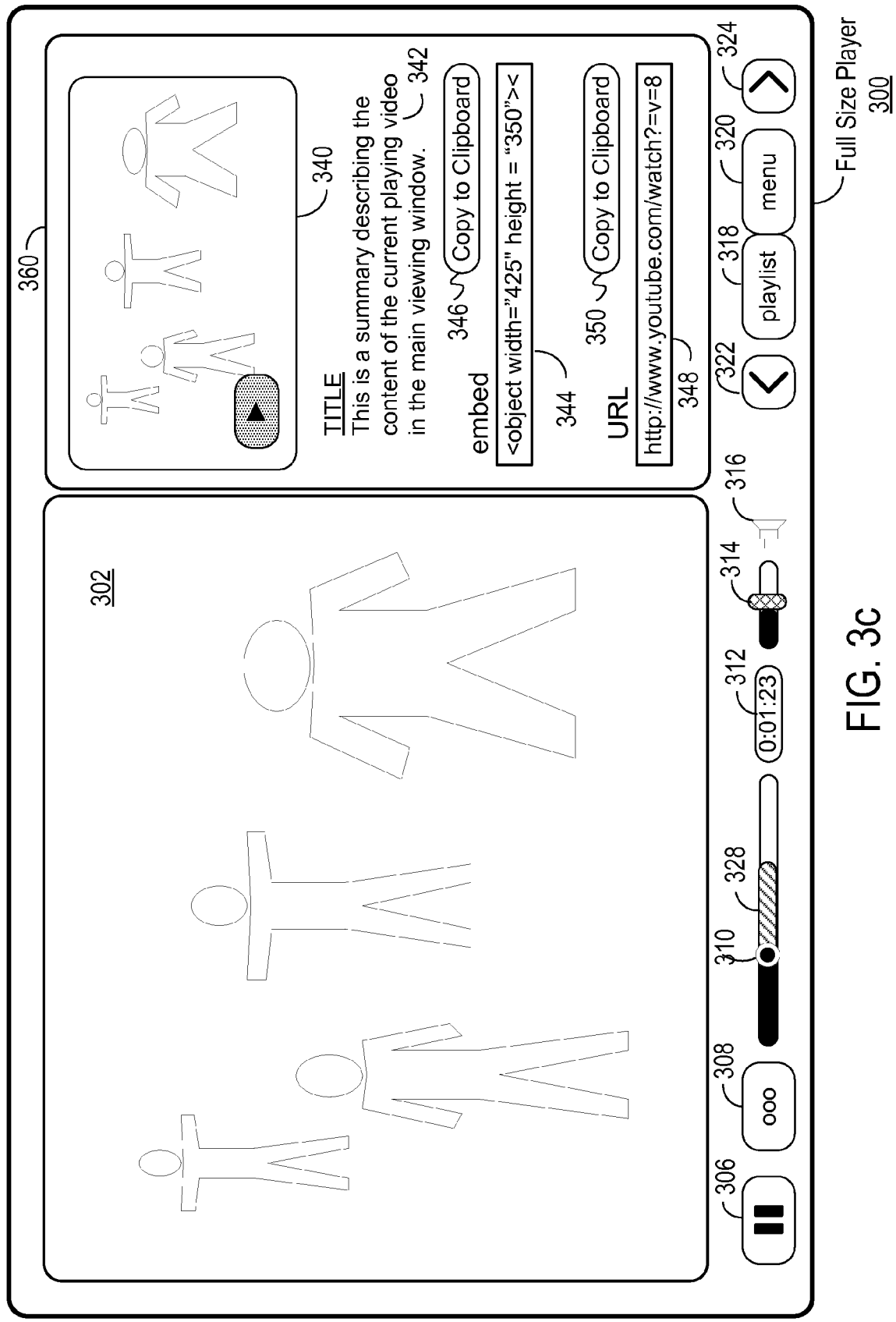
FIG. 3c is an example interface for a full-size video player displaying a menu screen in accordance with an embodiment of the present invention.

In one embodiment, the full-size player 300 includes a menu button 320 that causes a menu screen 360 to be displayed in place of the playlist window 304 when selected. An embodiment of a menu screen 360 is illustrated in FIG. 3c. Here, the current video is displayed as a smaller thumbnail 340 along with information 342 relating to the current video. The information 342 can include, for example, the video title, a summary describing the video content, or any other information related to the video. The menu screen 360 also displays embed code 344 and a button 346 to copy the embed code 344 to the clipboard. The embed code 344 provides source code (e.g., HTML source code) that can be copied and inserted into a website. This feature allows a user to add a replica of the playlist (and associated player parameters) to his/her own website. In one embodiment, the menu screen 360 further includes a URL 348 and a button 350 to copy the URL to the clipboard. The URL 348 provides a link to the current video being displayed in the main viewing window 302 of the player 300. The URL 348 provides direct access the current video from the video hosting website 100. A playlist button 318, when clicked, causes the playlist window 304 to again be displayed in place of the menu screen 360.

Figure 3D:
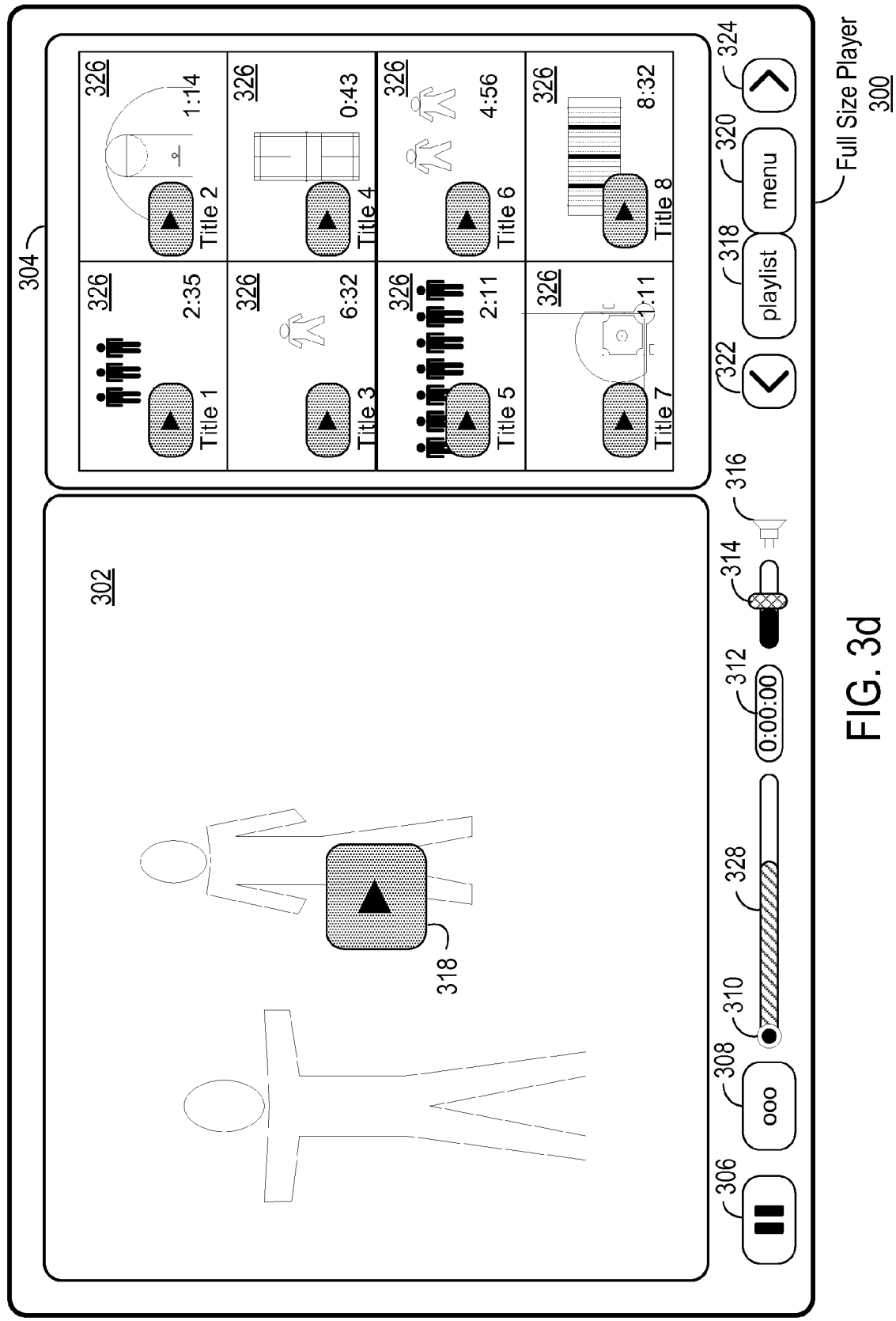
FIG. 3d is an example interface for a full-size video player prior to beginning playback in accordance with an embodiment of the present invention.

FIG. 3d illustrates an embodiment of the full-size player 300 prior to beginning playback of a video. Here, the main viewing window 302 displays a thumbnail of the current video. In one embodiment, a play button 318 is displayed in the main viewing window 302 over the thumbnail. The user can begin playing the video in the main viewing window 302 by selecting the play button 318. Alternatively, the user can play any of the other videos in the playlist window 304 by selecting a thumbnail 326 from the playlist window 304. The selected video replaces the current video in the main viewing window 302 and begins playback.

Figure 3E:
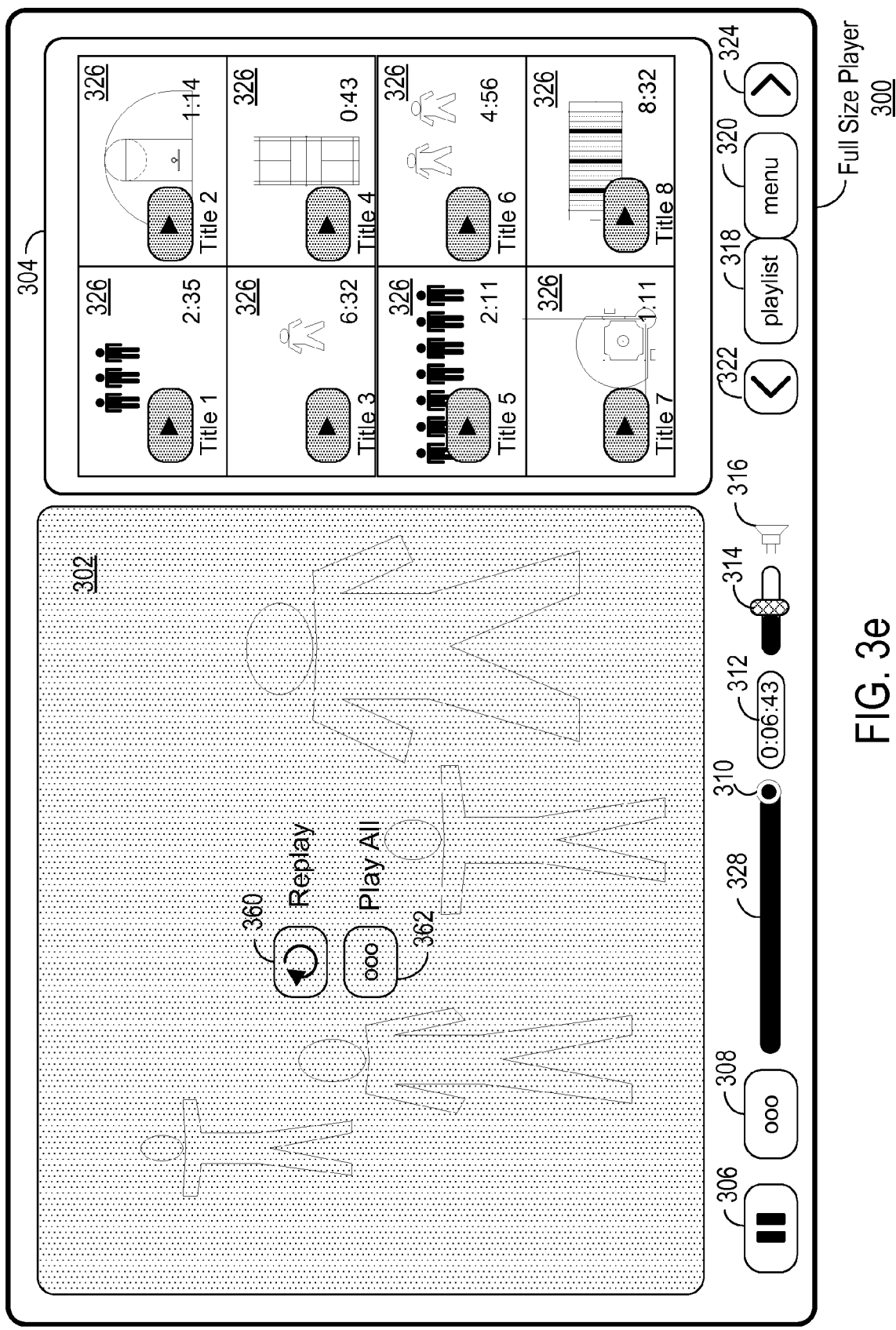
FIG. 3e is an example interface for a full-size video player displaying an end-of-video screen in accordance with an embodiment of the present invention.

FIG. 3e illustrates an embodiment of an end-of-video screen that is displayed when a video ends. In one embodiment, the main viewing window 302 dims, and a replay button 360 and play all button 362 is displayed. The replay button 360 replays the current video from its first frame while the play all button 362 plays through the full playlist from the beginning of the playlist.

Figure 4B:
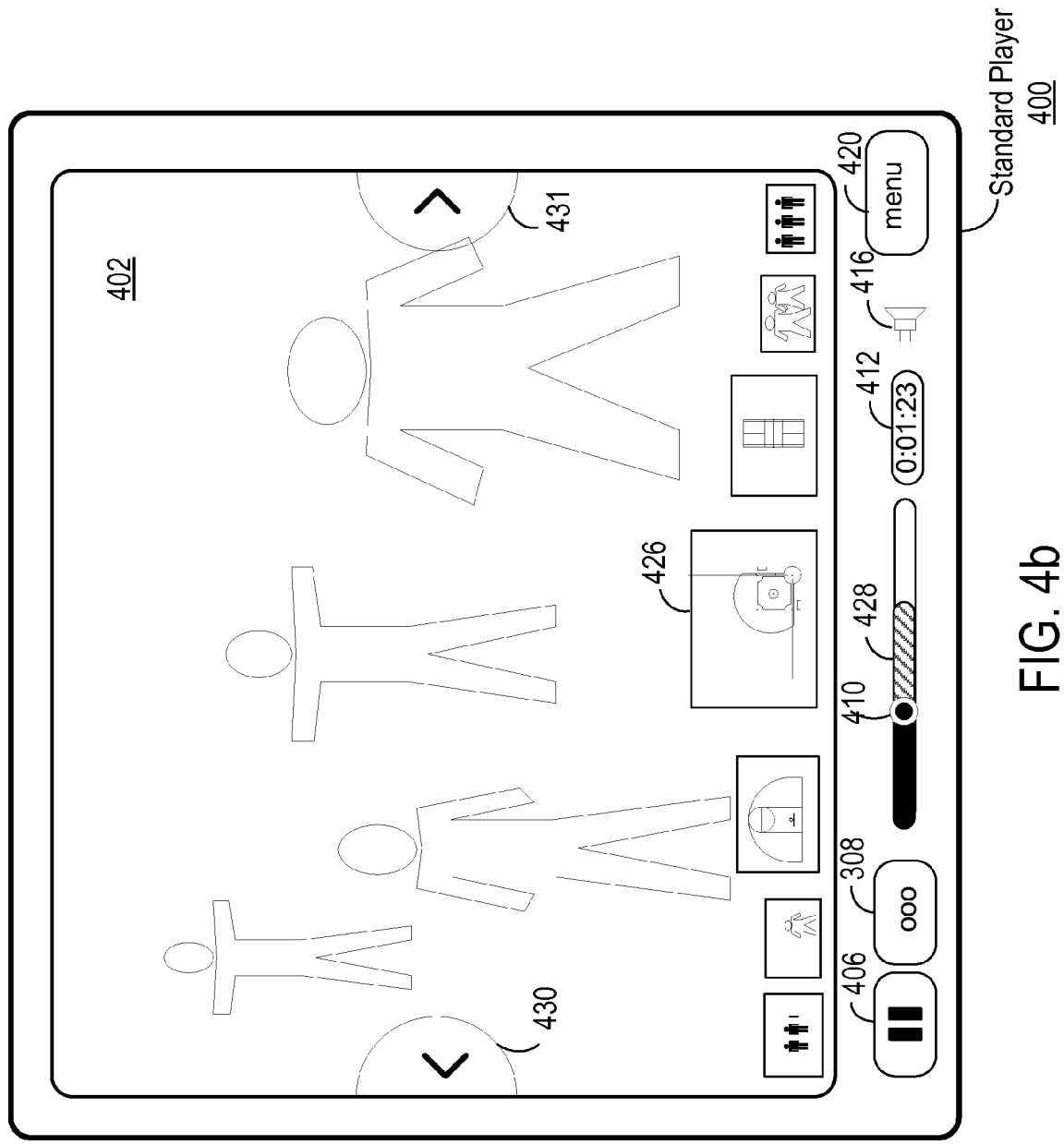
FIG. 4b is an example interface for a standard video player after a pointer rollover in accordance with an embodiment of the present invention.
Figure 4C:
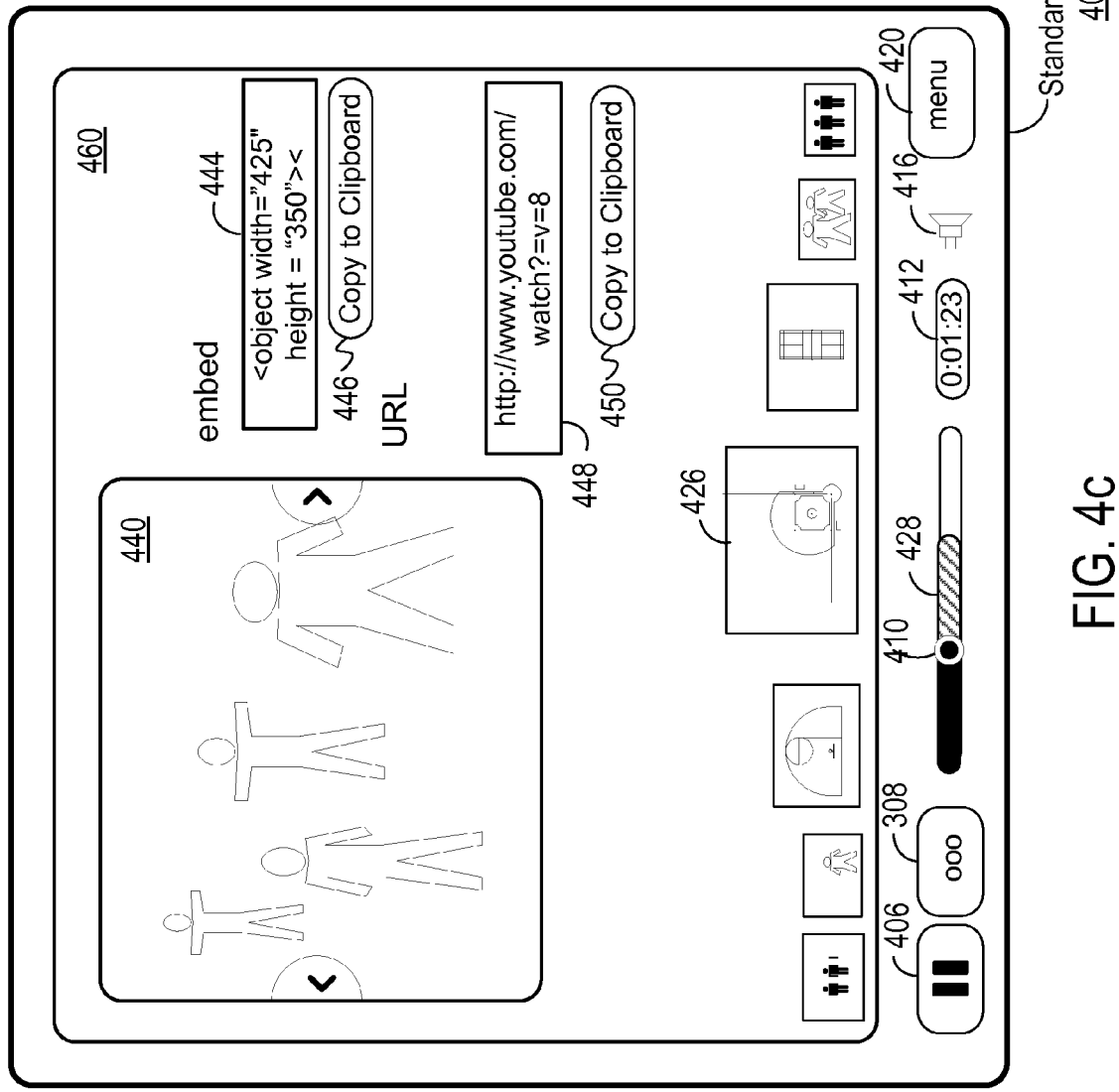
FIG. 4c is an example interface for a standard video player displaying a menu screen in accordance with an embodiment of the present invention.

FIGS. 4a-c illustrate a second embodiment having a video player for video playlists, referred to herein as a standard player 400. Referring first to FIG. 4a, the standard player 400 includes a main viewing window 402 for playing a current video similar to the full-size player 300. The standard player 400 further includes controls and indicators such as play/pause button 406, play all button 408, progress bar 410, download indicator 428, timer 412, mute button 416, and menu button 420 that operate similar to the controls and indicators in the full-size player 300. However, the standard player 400 provides a more compact display than the full-size player 300 because it does not include the playlist window 304 adjacent to the main viewing window 402.

In order to navigate the playlist in the standard player 400, the user can cause playlist thumbnails 426 to appear in the main viewing window 402 by moving the pointer over the main viewing window 402. An example of a standard player 400 with thumbnails 426 displayed is illustrated in FIG. 4b. In an alternative embodiment, the thumbnails and/or controls 430, 431 are always displayed. The user can then select a thumbnail 426 from the playlist to play the newly selected video. In one embodiment, a previous button 430 and a next button 431 are also displayed in the main viewing window 402 to navigate between videos in the playlist. When the user moves the pointer off the main viewing window 402, the playlist thumbnails 426, previous button 430, and next button 431 become hidden (e.g., as illustrated in FIG. 4a). In the described embodiment, the central displayed thumbnail is a different size from other thumbnails. In other embodiments, the thumbnails 426 are the same size, or some are the same size.

The standard player 400 also includes a menu button 420 that causes a menu screen 460 to be displayed in place of the main viewing window 402 as illustrated in FIG. 4c. The menu screen 460 includes a smaller window 440 of the currently playing video and allows the user to continue viewing the video uninterrupted. The menu screen 460 also includes thumbnails 426 for videos in the playlist. The menu screen 460 further includes embed 444 and URL 448 options similar to those described above.

Figure 5A:
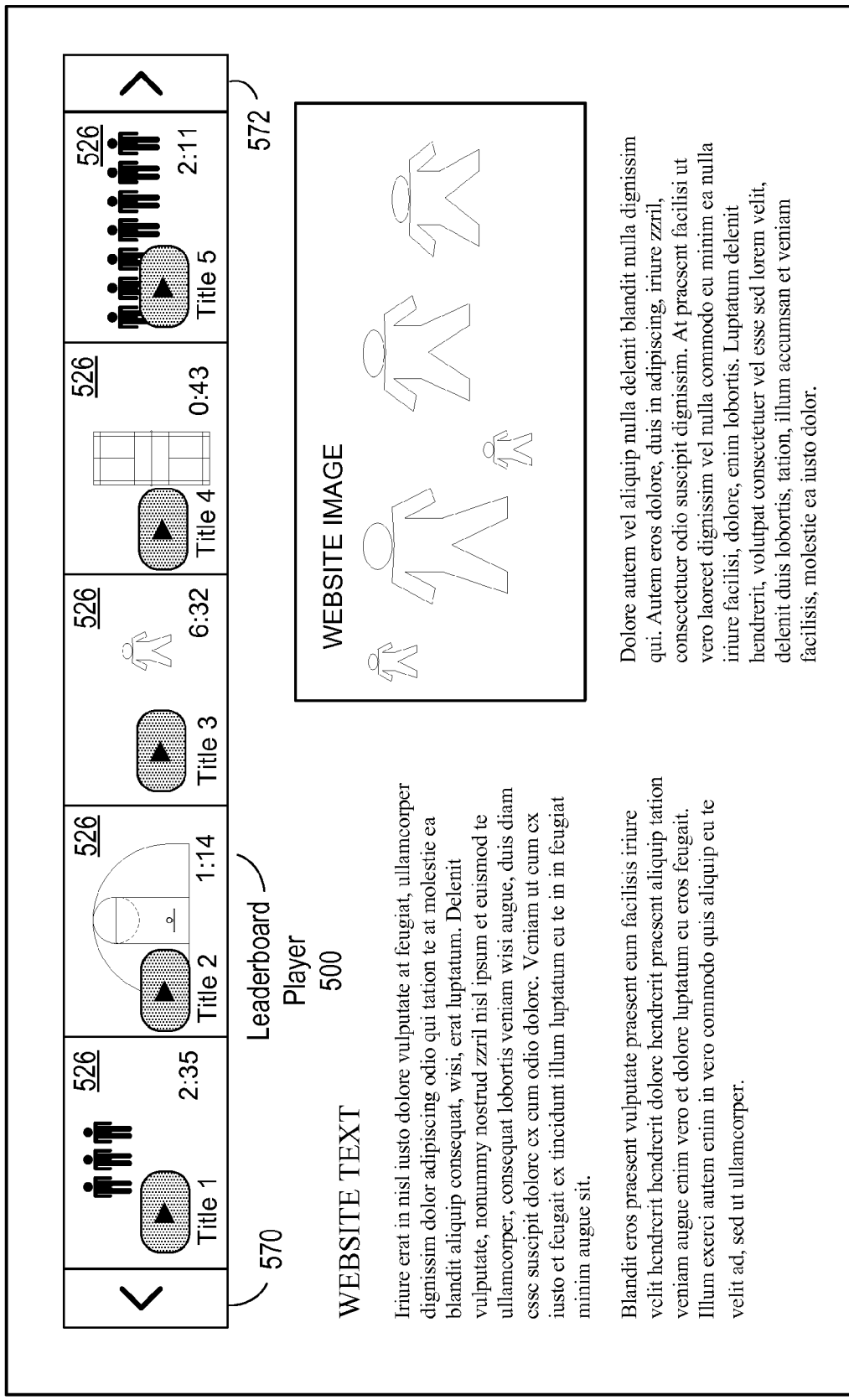
FIG. 5a is an example interface for a leaderboard video player embedded in a website in accordance with an embodiment of the present invention.
Figure 5B:
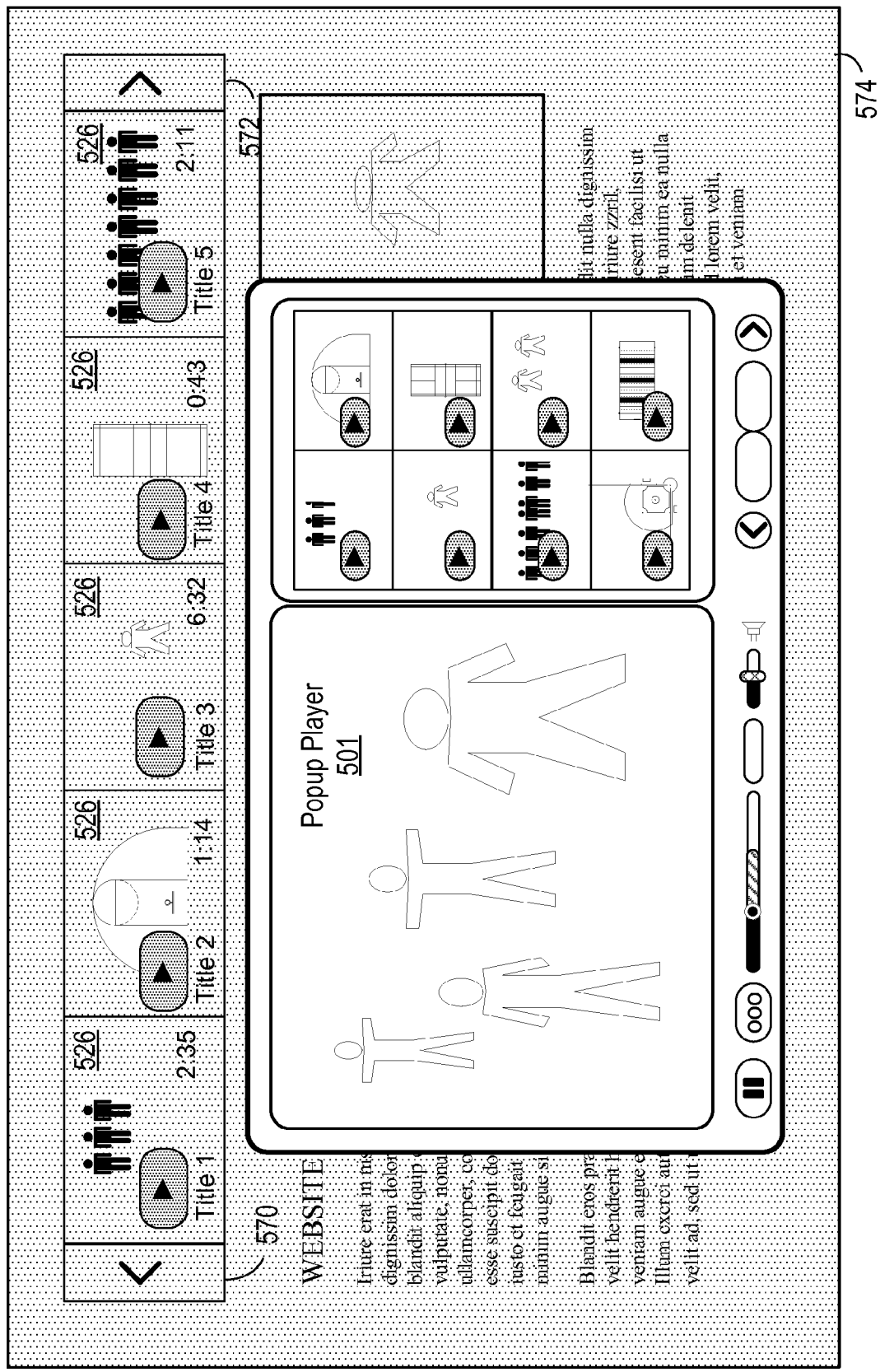
FIG. 5b is an example interface for a leaderboard video player after selecting a video for playback in accordance with an embodiment of the present invention.

A third type of video player is illustrated in FIGS. 5a-b and is referred to herein as the leaderboard player 500. The leaderboard player 500 initially displays a set of thumbnails 526 corresponding to videos in the playlist in the form of a banner embedded in a website 574. If the length of the playlist exceeds the number of displayed thumbnails 526, the player also includes left 570 and right 572 scroll buttons to scroll through the available thumbnails 526 in the playlist. A user can play a video from the leaderboard player 500 by clicking on any of the thumbnails 526.

FIG. 5b illustrates an embodiment of the leaderboard player 500 after the user has clicked on a thumbnail 526. Here, a pop up video player 501 similar to the full-size player 300 is displayed overlaying the website 574. In one embodiment, the website 574 is dimmed in the background. Indicators and controls in the popup player 500 operate similarly to the indicators and controls of the full-size player 300.

If advertisements are associated with the player, the advertisements can be displayed in a variety of different manners and can depend on preferences set by the publisher, the video hosting site, the viewer, the advertiser or any combination of preferences from the various entities. For example, in one embodiment, prior to playback of the requested content, an advertising window is superimposed on a video playback window. In one embodiment, the user is given an option to select or skip the advertisement. The advertisement can be text only, audio, video, or a combination.

In a second embodiment, the advertising window is presented as a banner located toward one edge of the video playback window. The banner is presented in opaque or translucent form, as desired. In yet another embodiment, the advertising window appears during the video playback, rather than before it. In such instance, the selected opacity/transparency of the advertising window is selected based on the amount of attention that is desired to be given to the advertising.

In yet another embodiment, the advertising window appears after the video playback. In one variation the window appears as a banner within a larger window of video content related to the content that was just displayed, i.e., material that the user might want to see based on the user's prior selection. Other aspects of an embodiment are indicators for the viewer as to the amount and placement of the advertising that accompanies requested video content. A timer/slider bar on the player is colored red to indicate portions that correspond to requested video content and yellow to indicate advertising. Timing icons that appear with the advertising make clear to the user how much longer the advertising will take. User interface controls allow the user to cancel advertising content and to move on to subsequent advertising content. User interfaces for advertising content are made distinctive vis-á-vis those for shared video so that the viewer is not confused as to whether any particular content is part of the shared video or advertising. Further details on user interface features for managing advertisement content is described in U.S. Provisional Patent Application No. 60/915,654 titled "User Interfaces for Web-Based Video Player" filed on May 2, 2007, and incorporated by reference herein in its entirety.

In one embodiment, publisher account database 192 maintains a record of which players in player database 150 are associated with which publisher 168. When a publisher 168 accesses player creation module 164, a lookup is performed to determine whether the publisher has any players available to be modified. If so, this selection is offered to the publisher 168. Alternatively, if the publisher does not yet have any players to edit, the publisher is offered only the opportunity to create a new player.

In one embodiment, video hosting website 100 has a selection of player templates available to assist the publisher 168 with creating her own player. Templates may pre-specify parameters such as player type (standard, full-size, leaderboard, etc.), color schemes, thumbnail location, etc. Alternatively, the publisher 168 is offered the opportunity to start from scratch without relying on any templates.

Figure 6A:
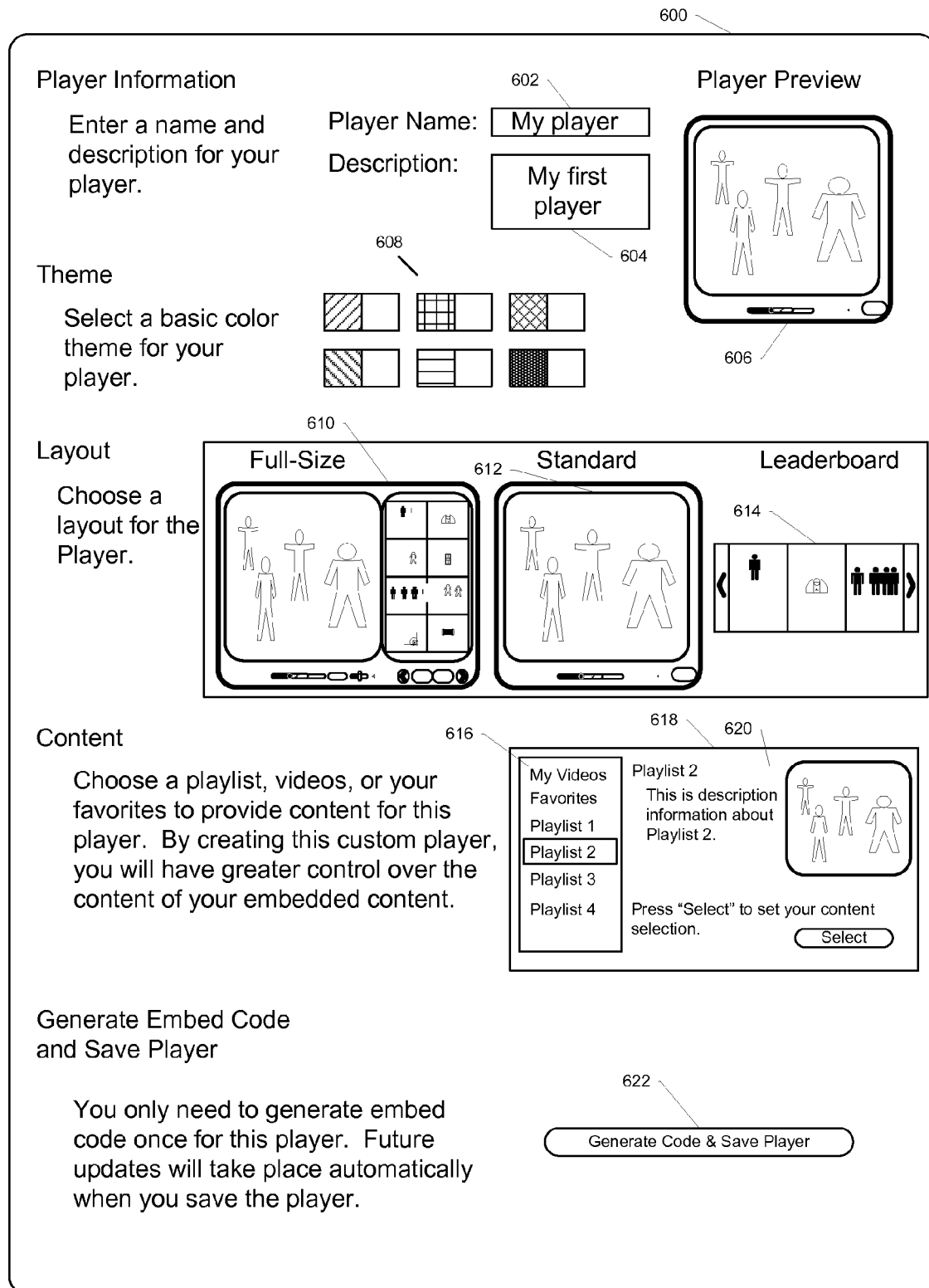

FIG. 6a illustrates a user interface page 600 for creating a new player using player creation module 164 in accordance with an embodiment of the present invention. A publisher 168 begins by entering a player name 602 and description 604 for the new player. A player preview region 606 in one embodiment updates as the publisher makes design choices in order to provide a preview of how the player will look.

After the publisher has chosen a name and description for the player, the publisher can then select a color theme from a provided set 608 of themes. In one embodiment (not shown), the publisher is offered an opportunity to design her own color scheme, for example by selecting colors from a color wheel or color palette. Next, the publisher indicates whether the player should be a full-size 610, standard 612, or leaderboard 614 layout, as described with respect to FIGS. 3-5.

The publisher then specifies what content should be associated with the new player—that is, what the player will actually play. In one embodiment, one region 616 of a content selection window 618 includes a list of selectable content, such as a set of playlists, a "My Videos" selection, to indicate that all of the publisher's videos should be included, and a "Favorites" selection to indicate that videos marked as a favorite of the publisher should be included. As will be appreciated by those of skill in the art, additional methods of selecting videos to associate with the player may also be used. A preview region 620 provides additional information about the content chosen in selection region 616.

Once the publisher has chosen the design elements she is happy with, she is invited to generate the embed code for the player, for example by pressing button 622.

Referring to FIG. 6b, once the publisher has clicked the Generate Code button 622, player creation module 164 dynamically determines the appropriate embed code for the new player and updates user interface page 600 to display the embed code 624, along with a button 626 to automatically copy the embed code to the clipboard of client 170.

Player creation module 164 saves the player information to player database 150 and creates an association between the player and the publisher. In one embodiment this association is indicated two ways—as a field associated with the player in player database 150, and as a field associated with the publisher in publisher account database 192. In alternative embodiments, other tables or indicators can be used to maintain the association between publishers and created players.

In one embodiment, the player information stored in player database 150 includes a static reference to videos associated with the player at the time the player is created. Alternatively, the player information includes a pointer to one or more playlists in playlist database 152. In this embodiment, a publisher can change the contents (e.g., audio, video or text) of a playlist without needing to edit the player. Since the player includes a pointer to the playlist rather than the playlist itself, the updated playlist will automatically be referenced by the player.

In an alternative embodiment (not shown), user interface page 600 additionally allows the publisher to indicate a region of the player in which advertisements or other messages should be displayed to viewers.

Once a player has been created, a publisher 168 can access player creation module 164 to edit the player. In one embodiment, once the publisher specifies the player to be edited, she is presented with user interface page 600 (FIG. 6b) in order to make any desired changes and then re-save the player to player database 150. Note that altering or updating the player does not require generation of a new embed code—consequently, any web page that embeds the player will automatically represent the updated version of the player without any further required coding.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A method for creating a customized video player, the method comprising:
    displaying by a client, a publisher interface comprising:
        1) controls for selecting a playlist, the playlist comprising pointers to a plurality of videos, and
        2) controls for selecting player appearance parameters for an embedded video player, the embedded video player configured to play the videos in the selected playlist, the player appearance parameters including a selection of a player type from a plurality of selectable player types, each player type having different player control layouts for viewing the videos in the selected playlist and for navigating between the videos in the selected playlist;
    receiving via a user input device of the client, a selection of player parameters identifying the playlist and the appearance parameters for inclusion in the embedded video player;
    transmitting the selection of player parameters to a server, wherein the server generates a player identifier associated with the received player parameters including the playlist and the appearance parameters, and stores the player identifier in association with the received player parameters;
    receiving from the server, an embed code referencing the player identifier, the embed code configured such that when embedded in a web site, the embed code configures the client to load the embedded video player having an appearance specified by the player appearance parameters associated with the player identifier and the embed code configures the embedded video player to play the videos specified in the playlist associated with the player identifier; and
    displaying the generated embed code via the publisher interface of the client.

2. The method of claim 1, wherein the embed code forms at least part of a uniform resource locator.

3. The method of claim 1, further comprising:
    loading the web site with the embed code in a browser executing on the client;

displaying the embedded video player having the appearance specified by the player appearance parameters; and displaying a representation of the videos specified in the playlist.

4. The method of claim 1, wherein the publisher interface further comprises controls for inputting a player name, and wherein the received player parameters include the player name.

5. The method of claim 1, wherein the publisher interface further comprises controls for selecting a color theme, and wherein the received player parameters include a selected color theme.

6. The method of claim 5, wherein the controls for selecting the color theme comprise controls for selecting between a plurality of predefined color themes.

7. The method of claim 1, wherein the plurality of selectable player types includes a standard player comprising a main viewing window for displaying the video, and wherein a set of thumbnails associated with the videos in the video playlist are displayed in the main viewing window responsive to a user interaction with the main viewing window.

8. The method of claim 1, wherein the plurality of selectable player types includes a full-size player comprising a main viewing window for displaying the video and a playlist window adjacent to the main viewing window for displaying selectable thumbnails associated with the videos in the video playlist.

9. The method of claim 1, wherein the plurality of selectable player types includes a leaderboard player comprising a banner of selectable thumbnails associated with the videos in the video playlist, wherein a selected video is displayed in a popup window responsive to a user selection of one of the selectable thumbnails.

10. A method for creating a customized video player, the method comprising:
    transmitting to a client, a publisher interface comprising:
        1) controls for selecting a playlist, the playlist comprising pointers to a plurality of videos, and
        2) controls for selecting player appearance parameters for an embedded video player, the embedded video player configured to play the videos in the selected playlist, the player appearance parameters including a selection of a player type from a plurality of selectable player types, each player type having different player control layouts for viewing the videos in the selected playlist and for navigating between the videos in the selected playlist;
    receiving from the client, player parameters identifying the playlist and the appearance parameters selected by a publisher via the publisher interface;
    generating an embed code associated with the received play parameters including the playlist and the appearance parameters, the embed code configured such that when embedded in a web site, the embed code configures the client to load the embedded video player having an appearance specified by the player appearance parameters and the embed code configures the embedded video player to play the videos specified in the playlist; and
    providing the generated embed code to the client for display via the publisher interface.

11. The method of claim 10, wherein the embed code forms at least part of a uniform resource locator.

12. The method of claim 10, wherein the publisher interface further comprises controls for inputting a player name, and wherein the received player parameters include the player name.

13. The method of claim 10, wherein the publisher interface further comprises controls for selecting a color theme, and wherein the received player parameters include a selected color theme.

14. The method of claim 13, wherein the controls for selecting the color theme comprise controls for selecting between a plurality of predefined color themes.

15. The method of claim 10, wherein the plurality of selectable player types includes a standard player comprising a main viewing window for displaying the video, and wherein a set of thumbnails associated with the videos in the video playlist are displayed in the main viewing window responsive to a user interaction with the main viewing window.

16. The method of claim 10, wherein the plurality of selectable player types includes a full-size player comprising a main viewing window for displaying the video and a playlist window adjacent to the main viewing window for displaying selectable thumbnails associated with the videos in the video playlist.

17. The method of claim 10, wherein the plurality of selectable player types includes a leaderboard player comprising a banner of selectable thumbnails associated with the videos in the video playlist, wherein a selected video is displayed in a popup window responsive to a user selection of one of the selectable thumbnails.

18. A non-transitory computer readable storage medium including computer executable code for creating a customized video player, the code when executed by one or more processors causes the one or more processors to perform steps comprising:
    transmitting to a client, a publisher interface comprising:
        1) controls for selecting a playlist, the playlist comprising pointers to a plurality of videos, and
        2) controls for selecting player appearance parameters for an embedded video player, the embedded video player configured to play the videos in the selected playlist, the player appearance parameters including a selection of a player type from a plurality of selectable player types, each player type having different player control layouts for viewing the videos in the selected playlist and for navigating between the videos in the selected playlist;
    receiving from the client, player parameters identifying the playlist and the appearance parameters selected by a publisher via the publisher interface;
    generating an embed code associated with the received play parameters including the playlist and the appearance parameters, the embed code configured such that when embedded in a web site, the embed code configures the client to load the embedded video player having an appearance specified by the player appearance parameters and the embed code configures the embedded video player to play the videos specified in the playlist; and
    providing the generated embed code to the client for display via the publisher interface.

19. The non-transitory computer readable storage medium of claim 18, wherein the embed code forms at least part of a uniform resource locator.

20. The non-transitory computer readable storage medium of claim 18, wherein the publisher interface further comprises controls for inputting a player name, and wherein the received player parameters include the player name.

21. The non-transitory computer readable storage medium of claim 18, wherein the publisher interface further comprises controls for selecting a color theme, and wherein the received player parameters include a selected color theme.

22. The non-transitory computer readable storage medium of claim 21, wherein the controls for selecting the color theme comprise controls for selecting between a plurality of pre-defined color themes.

23. The non-transitory computer readable storage medium of claim 18, wherein the plurality of selectable player types includes a standard player comprising a main viewing window for displaying the video, and wherein a set of thumbnails associated with the videos in the video playlist are displayed in the main viewing window responsive to a user interaction with the main viewing window.

24. The non-transitory computer readable storage medium of claim 18, wherein the plurality of selectable player types includes a full-size player comprising a main viewing window for displaying the video and a playlist window adjacent to the main viewing window for displaying selectable thumbnails associated with the videos in the video playlist.

25. The non-transitory computer readable storage medium of claim 18, wherein the plurality of selectable player types includes a leaderboard player comprising a banner of selectable thumbnails associated with the videos in the video playlist, wherein a selected video is displayed in a popup window responsive to a user selection of one of the selectable thumbnails.

\* \* \* \* \*